P. CARLSON.
TAIL GATE OPERATING MECHANISM FOR DUMP TRUCKS.
APPLICATION FILED JULY 23, 1919.

Patented Mar. 2, 1920.
3 SHEETS—SHEET 1.

Inventor
Philip Carlson
By Chamberlain & Newman
Attorneys

P. CARLSON.
TAIL GATE OPERATING MECHANISM FOR DUMP TRUCKS.
APPLICATION FILED JULY 23, 1919.

1,332,424.

Patented Mar. 2, 1920.
3 SHEETS—SHEET 2.

Inventor
Philip Carlson
By Chamberlain & Newman
Attorneys

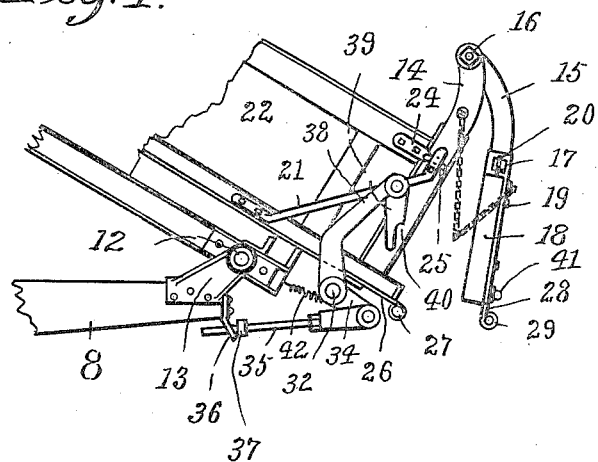
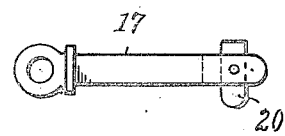
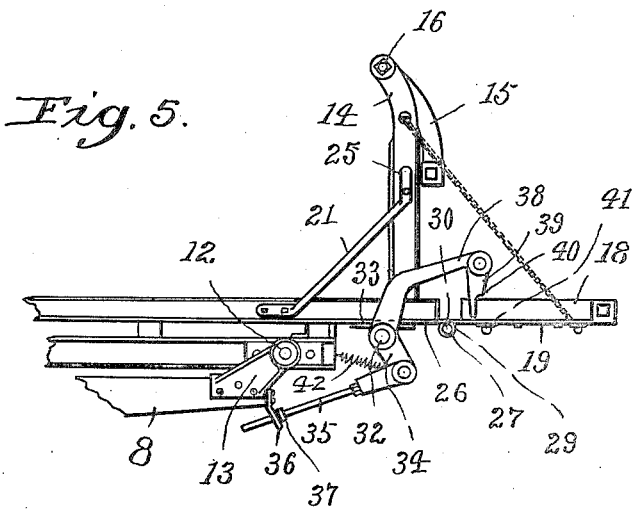

UNITED STATES PATENT OFFICE.

PHILIP CARLSON, OF BRIDGEPORT, CONNECTICUT.

TAIL-GATE-OPERATING MECHANISM FOR DUMP-TRUCKS.

1,332,424.  Specification of Letters Patent.  Patented Mar. 2, 1920.

Application filed July 23, 1919. Serial No. 312,730.

*To all whom it may concern:*

Be it known that I, PHILIP CARLSON, a citizen of the United States, and resident of Bridgeport, in the county of Fairfield and State of Connecticut, have invented certain new and useful Improvements in Tail-Gate-Operating Mechanism for Dump-Trucks, of which the following is a specification.

My invention relates to new and useful improvements in delivery wagons or trucks and more especially to mechanism for operating the tail gate of bodies of motor dump trucks, so-called.

The object of the invention is to provide an improved mechanism for operating the tail gate of dump truck bodies and whereby the gate may be swung open either from the top or bottom, and so that the gate will be automatically opened at the bottom when swinging from the top and when the body is tilted for dumping, and so that it will likewise automatically close and be locked shut, when the load has been dumped and the body lowered to its normal position, and further to provide means whereby the said tail gate may be hinged to the bottom and dropped outward in alinement with the floor of the body, to form an extension when the body is used as a platform body for the moving of furniture and the like.

With these and other objects in view the invention resides and consists in the construction and novel combination and arrangement of parts hereinafter more fully described, illustrated in the accompanying drawings, and pointed out in the claims hereto appended, it being understood that various changes in the form, proportion, size and minor details of construction within the scope of the claims may be resorted to without departure from the spirit or sacrificing any of the advantages of the invention.

Similar characters of reference denote like or corresponding parts throughout the several figures of the accompanying drawings forming a part of this specification, and upon which, Figure 1 shows a side elevation of a motor truck provided with a dump body to which my improved tail gate operating mechanism is shown applied.

Fig. 4 shows a further side view of a portion of the chassis frame, the body being in a tilted position and the tail gate released at the bottom and in an open hanging position.

Fig. 5 is a further side view of a part of the chassis frame and the body, with side boards removed, and tail gate lowered and supported by chains to form a platform extension, and Fig. 6 shows on an enlarged scale the locking pin used to connect the upper parts of the tail gate to the arms hinged to the body standards.

Figure 1:
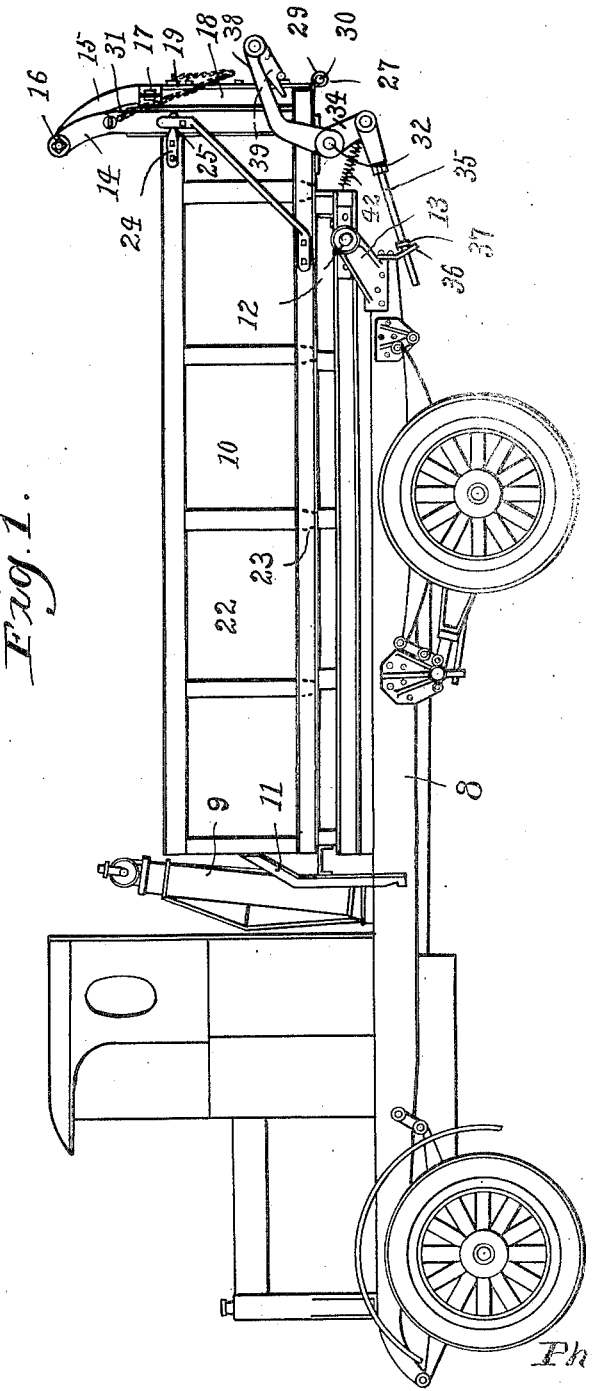
Figure 2:
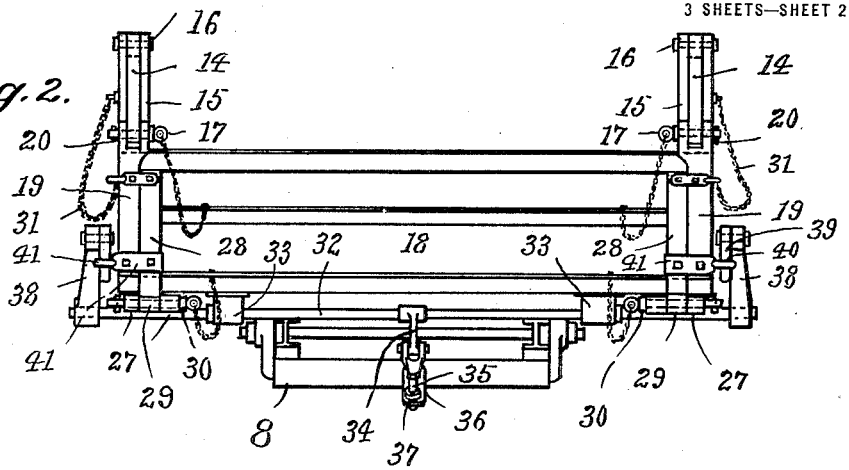
Fig. 2 is a rear end elevation of the body and tail gate, with operating mechanism as shown in Fig. 1.

Referring in detail to the characters of reference marked upon the drawings, 8 indicates the chassis frame of a motor truck, 9 a hoisting apparatus supported thereon and connected with the body 10 through the medium of an arm 11, carried by the forward end of the body. The rear end of the body, as shown, is pivotally supported at 12 upon the brackets 13 secured to the rear end of the chassis frame, and is thus adapted to be swung upon its pivot when the forward end is raised and lowered by the hoisting apparatus referred to.

As constructed the body is shown as made up of a number of pieces so as to form either an open platform body or a closed dumping body and in this connection it will be noted that I have provided fixed posts 14, upon each of the rear corners. The upper ends of the curved hangers 15 are pivotally secured to these posts by means of bolts 16 as shown. A square hole is formed in the lower end of each of these hangers to receive the square pins 17 shown in Fig. 6.

Upon the tail gate 18 is secured straps 19 whose upper ends are recessed to receive the lower ends of the hangers 15 and are also provided with square holes that register with the holes in the hangers and likewise to receive the pins 17 to rigidly secure the parts together. The inner ends of the pins 17 have a pawl 20 pivoted therebetween, and which is adapted to be held in alinement with the pin, as shown in dotted lines, when inserting the pin, but which drops to the crosswise position shown in full lines when the pin is inserted.

Each of the posts 14 are provided with a brace 21 one end of which is fastened to the side of the post and the other end to the outer edge of the floor of the body. The side boards 22 of the body are detachably supported upon the top edge of the floor and against the posts 14 and are provided with suitable ends 23 that are seated in sockets of the floor and are further provided with metal extensions 24 to engage pockets 25 formed between the ends of the braces and the posts 14 before mentioned.

Plates 26 having projected eyes 27 are secured to the under side of the floor of the body and serve to form the fixed leaves of the bottom pair of hinges for the tail gate 18. The hinge straps 28 secured to the outside of the tail gate are provided with an eye 29 in their lower ends that registers with the eyes 27 of the plates on the under side of the body and are hingedly connected therewith by means of the pins 30 connected by a chain to the gate. These pins 30 are similar to the pins 17, in the square holes, connecting the gate straps 19 and the hanger 15, except that they are round pins instead of square. They are also provided with pawls in their end portion which automatically lock them in position.

Figure 3:
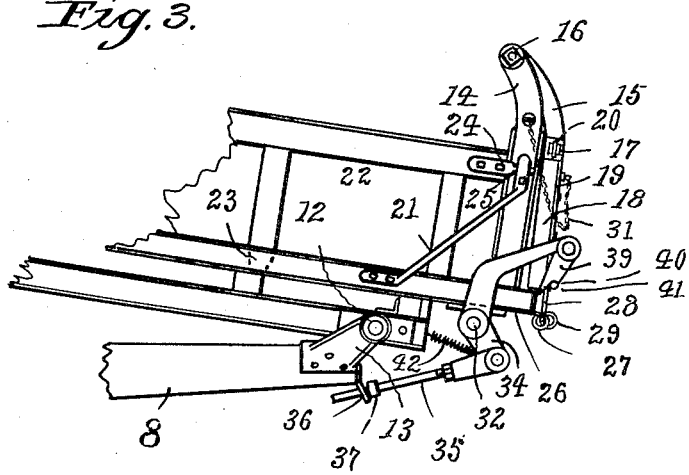
Fig. 3 is a side elevation of the rear portion of the body including the tail gate and the tail gate operating mechanism, the body being shown slightly tilted preparatory to dumping.

From the foregoing it will be seen that if the bottom pins 30 are removed the tail gate will be free to swing upon the pivot 16 should the body be raised as when dumping a load, causing the gate to open at the bottom as shown in Figs. 3 and 4. On the other hand if the square pins 17 are removed from their sockets the gate may be lowered to form a platform extension as indicated in Fig. 5.

A pair of chains 31 are provided for supporting the tail gate in its lowered position as shown in Fig. 5 one end being connected to the posts 14 and the other to the outer portion of the tail gate so as to retain the same in an extended position substantially parallel with the floor of the body.

A rocker shaft 32 is journaled in bearings 33 secured to the under side of the rear end portion of the body and upon the central portion of this shaft I provide an arm 34 that is pivotedly connected to one end of a rod 35. The lower end of this rod is seated in a bracket 36 secured to the end of the chassis frame in a manner to cause the rocker shaft to rock in its bearing when the rear end of the body is tilted down toward the end of the chassis frame. This rod is in part threaded and provided with a lock nut 37 so that it may be adjusted to insure the proper operation of the tail gate. A spring 42 one end of which is connected to the body and the other end to the arm 34, serves to yieldably retain the crooked arms 38 in position to engage and support the tail gate. Upon each of the outer ends of this rocker shaft I provide a crooked arm 38 which relatively speaking, are disposed upward and rearward past the ends of the tail gate and carry a pawl 39 which is pivotedly connected to their outer ends. The lower side of the end portion of each of these pawls is cut away to form a shoulder 40 as clearly appears in Figs. 3, 4 and 5 and which in practice serves to engage the ends of the lugs 41 secured to the two end portions of the tail gate, when the latter is being closed as indicated in Fig. 3, and so as to insure the final closing of the tail gate with the final lowering movement of the body. These pawls thus serve to retain the tail gate closed when the body is normally positioned upon the chassis frame and the gate hinged at the top for dumping, but is entirely disconnected, and not used when the tail gate is hinged at the bottom and used as an extension platform, as indicated in Fig. 5.

Having thus described my invention, what I claim and desire to secure by Letters Patent, is:

1. The combination with a vehicle body, of a tail gate therefor, hinge connections of the body and gate whereby the latter may be swung open from either the top or bottom, arms pivoted to the body, pawls carried by the arms to engage the tail gate, connections between the truck frame and the arms whereby the latter are operated to engage and disengage the tail gate by the tilting of the body.

2. The combination with a vehicle body, of a tail gate therefor, hinge connections of the gate with both the top and bottom of the body whereby the gate may be swung open from either the top or bottom, arms pivotedly mounted on the body, pawls carried by the arms, detachable connections of the gate with the upper hinge members, means for supporting the gate when in a lowered position, connections between the truck frame and the tail gate whereby the latter is opened and closed by raising and lowering the body.

3. The combination of a vehicle body having standards upon the rear end, hangers pivoted to the standards, a tail gate detachably connected to the hangers, detachable hinge connections of the gate to the body whereby the latter may be swung from the top and open at the bottom, arms pivotedly mounted on the body, pawls carried by the arms to engage and disengage the tail gate by the tilting of the body.

4. The combination with a vehicle body, of hangers pivoted to the body, a tail gate detachably connected to the hangers, hinge connections of the body and gate whereby the latter may be swung from the bottom, chains to support the gate when hinged at the bottom, arms pivotedly mounted on the body, pawls carried by the arms to engage the tail gate, connections between the truck frame and the arms whereby the latter are operated to engage and disengage the tail gate by the tilting of the body.

5. The combination of a truck frame, a body tiltably mounted thereon, a tail gate hinged to the body, arms pivotedly mounted on the body, pawls carried by the arms to engage the tail gate, connections between the truck frame and the arms whereby the latter are operated to engage and disengage the tail gate by the tilting of the body.

6. The combination with a truck frame, a body tiltably mounted thereon and having a tail gate hinged to the top edge of the body, a rocker shaft mounted on the body, arms mounted on the shaft, pawls carried by the arms to engage the tail gate, connections between the truck frame and the shaft whereby the latter and the arms are operated to engage and disengage the tail gate by the tilting of the body.

7. The combination with a truck frame, of a body tiltably mounted thereon, a tail gate, means for hingedly connecting either the top or bottom portion of the tail gate to the body, a rocker shaft mounted on the body, arms mounted on the shaft, pawls carried by the arms to engage the tail gate, connections between the truck frame and the shaft whereby the latter and the arms are operated to engage and disengage the tail gate by the tilting of the body.

8. The combination with a truck frame, of a body tiltably mounted thereon and having hinge members secured to both the top and bottom of its rear end portion, a tail gate having upper and lower coacting hinge sections adapted to register with the hinge member secured to the body, means for hingedly connecting the hinge sections upon the tail gate with either the top or bottom hinge members of the body, a rocker shaft mounted on the body, arms mounted on the shaft, pawls carried by the arms to engage the tail gate, connections between the truck frame and the shaft whereby the latter and the arms are operated to engage and disengage the tail gate by the tilting of the body.

9. The combination with a truck frame, of a body tiltably mounted thereon and having hinged members secured to both the top and bottom portions of the rear end of the body, a tail gate also having hinge portions at top and bottom and adapted to be detachably connected to either of said hinge members on the body, a chain one end of which is connected to the upper portion of the end of the body and the other end to the tail gate to support the same when hinged to the lower portion of the body and disconnected from the top portion, mechanism attached to the body and fulcrumed from the fixed end of the chassis including pawls to engage the lower end portion of the tail gate when hinged at the top and in a manner to close the same when the body is being lowered in position upon the chassis.

Signed at Bridgeport, in the county of Fairfield and State of Connecticut this 18th day of July, A. D. 1919.

PHILIP CARLSON.

Witnesses:
 BESSIE M. BLAKE,
 ELIZABETH J. BRADY.